United States Patent [19]
Watanabe et al.

[11] Patent Number: 5,795,650
[45] Date of Patent: Aug. 18, 1998

[54] PRESSURE-SENSITIVE ADHESIVE SHEET

[75] Inventors: Shunpei Watanabe; Takashi Suzuki; Shuuichiro Ikeda, all of Saitama-ken, Japan

[73] Assignee: Lintec Corporation, Japan

[21] Appl. No.: 711,213

[22] Filed: Sep. 9, 1996

[30] Foreign Application Priority Data

Sep. 27, 1995 [JP] Japan ................... 7-273589

[51] Int. Cl.$^6$ ................................................ C09J 7/02
[52] U.S. Cl. ............................ 428/355 AC; 428/343
[58] Field of Search .................... 428/355 AC, 343

[56] References Cited

U.S. PATENT DOCUMENTS 465,213  4/1891  Schlademan ................. 524/272
4,737,410  4/1988  Kantner ..................... 428/355 AC

*Primary Examiner*—Jenna Davis
*Attorney, Agent, or Firm*—Brinks Hofer Gilson & Lione; G. Peter Nichols

[57] ABSTRACT

A pressure-sensitive adhesive sheet 1A is for use by sticking onto a liquid crystal cell, and it has a construction wherein the pressure-sensitive adhesive layer 3 is joined to one side of the base material layer 2 which is constructed with a light-polarizing sheet and a release sheet 4 stuck onto the other side from the base material layer 2 of the pressure-sensitive adhesive layer 3. As a main polymer for constituting the pressure-sensitive adhesive layer 3, an acrylic-based polymer is for example used, of which weight-average molecular weight is 600,000 to 2,000,000. Further, a plasticizer is added to the pressure-sensitive adhesive layer 3. According to the pressure-sensitive adhesive sheet, the stress which is produced by contraction, for example, of the base material layer is relieved and stress concentration can be reduced. In particular, white marking and color unevenness of the liquid crystal cell can be suppressed.

5 Claims, 1 Drawing Sheet

# PRESSURE-SENSITIVE ADHESIVE SHEET

BACKGROUND OF THE INVENTION

1. Field of the Invention

This invention relates to a pressure-sensitive adhesive sheet which is to be stuck onto an adherend, and in particular relates to a pressure-sensitive adhesive sheet which forms optical parts, such as light-polarizing sheets for example, which are used by being stuck onto the liquid crystal cell of a liquid crystal display.

2. Description of the Prior Art

Light-polarizing sheets can be used by being stuck onto the liquid crystal cells of liquid crystal display devices (LCD). A pressure-sensitive adhesive layer is formed on one surface of the light-polarizing sheet for sticking to another optical part such as a liquid crystal cell for example (hereinafter, such optical parts are typified by "liquid crystal cell"), and a release sheet is stuck onto this pressure-sensitive adhesive layer. Furthermore, a protective sheet (protective film) constructed with a protective sheet base material and a pressure-sensitive adhesive-layer is stuck onto the other surface of the light-polarizing sheet which is positioned on the opposite side to the pressure-sensitive adhesive layer of the light-polarizing sheet, in order to protect the other surface of the light-polarizing sheet.

In this case, the light-polarizing sheet is used by peeling off the release sheet, sticking the exposed pressure-sensitive adhesive layer to a liquid crystal cell and then peeling off the protective sheet.

A base material of the light-polarizing sheet used on such a liquid crystal cell generally has a triple-layer structure with a PVA based polarizer sandwiched between two TAC (triacetylcellulose)-based protective films. However, because of the characteristics of these materials, the base material of the light-polarizing sheet has poor dimensional stability. In particular, the base material is likely to experience a pronounced change in dimensions due to contraction caused in high temperature or high temperature and high humidity environments.

Hence, when such a light-polarizing sheet having the base material is stuck onto a liquid crystal cell with a pressure-sensitive adhesive, defects such as air bubbles generated within the pressure-sensitive adhesive layer, lifting of the pressure-sensitive adhesive layer and peeling off and the like are liable to occur.

In the past, the two-liquid crosslinking-type pressure-sensitive adhesives which have a high pressure-sensitive adhesive strength and a high shear strength have been used as the pressure-sensitive adhesive which forms the pressure-sensitive adhesive layer in order to prevent these problems from arising. By using a pressure-sensitive adhesive of this type, it has been possible to provide improvement in respect of the problems such as the lifting and peeling which are caused by contraction of the base material of the light-polarizing sheet. On the other hand, however, since the contractile stress of the base material of the light-polarizing sheet cannot be absorbed and alleviated by the pressure-sensitive adhesive, the distribution of the residual stress in the base material of the light-polarizing sheet becomes uneven. In particular, stress is likely to be concentrated in the outer peripheral portion of the base material of the light-polarizing sheet. As a result, there is a problem in that so called "white marking" is liable to appear with TN (TFT) liquid crystal cells and color unevenness is liable to appear with STN liquid crystal cells. Here, it should be noted that "white marking" means a phenomenon that a black non-transparent portion of a liquid crystal cell becomes partially transparent due to uneven contraction of a light-polarizing sheet attached to the liquid crystal cell.

SUMMARY OF THE INVENTION

In view of the problems described above, the present invention has been made. Accordingly, an object of this invention is to provide a pressure-sensitive adhesive sheet which can relieve the stress which is produced by the contraction or shrinkage of the base material layer and with which stress concentration can be minimized, while firm bonding with respect to the base material layer being maintained. In particular, an object of the present invention is to provide a pressure-sensitive adhesive sheet with which occurrence of the white marking and color unevenness of liquid crystal cells can be suppressed.

In order to achieve the above-mentioned object, the present invention is directed to a pressure-sensitive adhesive sheet which comprises a base material layer; and a pressure-sensitive adhesive layer which contains a pressure-sensitive adhesive composition and a plasticizer, wherein the weight-average molecular weight of the main polymer of the pressure-sensitive adhesive composition of the pressure-sensitive adhesive layer is 600,000 to 2,000,000.

According to the present invention having the above structure, there is no occurrence of lifting or peeling of the pressure-sensitive adhesive layer from the base material layer. Further, since the pressure-sensitive adhesive layer relaxes the stress caused by contraction or shrinkage of the base material layer, it is possible to relieve the local stress concentrations at the ends of the pressure-sensitive adhesive sheet. Consequently, this has the effect of suppressing the phenomena which are produced by the uneven stress distribution in the base material layer, such as the white marking with TN (TFT) liquid crystal cells and the color unevenness with STN liquid crystal cells for example. Furthermore, in this pressure-sensitive adhesive sheet, it is possible to obtain the the above results with a relative simple layered structure, and therefore its production is easy.

In this pressure-sensitive adhesive sheet, it is preferred that the shear modulus of the pressure-sensitive adhesive layer is $4.0 \times 10^5$ to $2.0 \times 10^5$ [dyn/cm$^2$].

Further, it is also preferred that the relaxation modulus after 100 seconds G(100) of the pressure-sensitive adhesive layer is $1.0 \times 10^5$ to $6.0 \times 10^5$ [dyn/cm$^2$].

Furthermore, it is also preferred that the amount of the said plasticizer added is 0.1 to 60 parts by weight with respect to 100 parts by weight of the pressure-sensitive adhesive composition.

Moreover, in the preferred application of this present invention, the base material layer is a plate-like optical component.

Other objects, structures and advantages of the present invention will be apparent when the following detailed description of the preferred embodiments will be considered taken in conjunction with the accompanying drawings.

DESCRIPTION OF THE PREFERRED EMBODIMENTS

Hereinafter, preferred embodiments of a pressure-sensitive adhesive sheet according to the present invention will be described with reference to the appended drawings.

Figure 1:
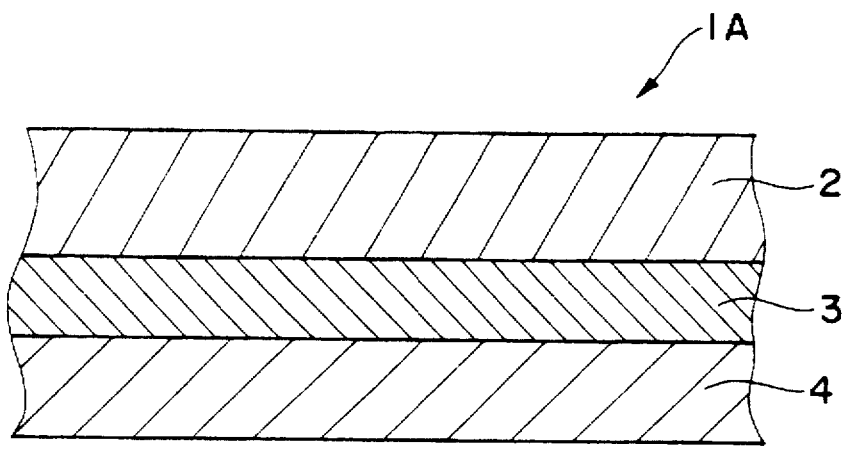
FIG. 1 is a cross-sectional view which shows a first embodiment of a pressure-sensitive adhesive sheet according to the present invention.

FIG. 1 is a cross-sectional view which shows a first embodiment of a pressure-sensitive adhesive sheet according to the present invention, in which the pressure-sensitive adhesive sheet is used as a light-polarizing sheet which is to be stuck to a liquid crystal cell. As shown in the drawing, the adhesive sheet 1A of the invention is mainly used for sticking onto a TN (TFT) liquid crystal cell. The pressure-sensitive adhesive sheet is constructed from a base material layer 2, a pressure-sensitive adhesive layer 3 having one side which is joined to the base material layer 2 and the other side opposite to the one side, a release sheet 4 which is stuck to the other side of the pressure-sensitive adhesive layer 3.

The base material layer 2 in this embodiment is formed into a light-polarizing sheet (sheet-like optical part), and it has a triple layer construction which, for example, includes the PVA-based polarizer inserted between two triacetylcellulose films.

The base material layer 2 itself has low dimensional stability with respect to changes in the environmental conditions, and in particular it has a nature such that it contracts and thereby the dimensions become smaller when it is subjected to high temperature, or high temperature/high humidity conditions.

The pressure-sensitive adhesive layer 3 is mainly formed of a pressure-sensitive adhesive (pressure-sensitive adhesive composition), and a plasticizer for plasticizing the adhesive composition.

As for the materials for the pressure-sensitive adhesive (pressure-sensitive adhesive composition) from which the layer 3 is constructed, any of rubber-based pressure-sensitive adhesives, acrylic-based pressure-sensitive adhesives and silicone-based pressure-sensitive adhesives and the like can be used. Among these adhesives, it is particularly preferred that the acrylic-based pressure-sensitive adhesives are used as its main composition.

The acrylic-based pressure-sensitive adhesives are formed of polymers or copolymers in which a main monomer component of low Tg which provides the adhesive properties, a comonomer component of high Tg which imparts adhesive properties and cohesive strength, and a functional group containing monomer for crosslinking and improving the adhesive properties are contained as main components.

As for examples of the main monomer component, alkyl esters of acrylic acid such as ethyl acrylate, butyl acrylate, amyl acrylate, 2-ethylhexyl acrylate, octyl acrylate, cyclohexyl acrylate and benzyl acrylate and the like, and alkyl esters of methacrylic acid such as butyl methacrylate, 2-ethylhexyl methacrylate, cyclohexyl methacrylate and benzyl methacrylate and the like can be cited.

As for examples of the comonomer components, methyl acrylate, methyl methacrylate, ethyl methacrylate, vinyl acetate, styrene and acrylonitrile and the like can be cited.

As for examples of the functional groups containing monomer components, carboxylic acid group-containing monomers such as acrylic acid, methacrylic acid, maleic acid and itaconic acid, hydroxyl group-containing monomers such as 2-hydroxyethyl (meth) acrylate, 2-hydroxypropyl (meth) acrylate and N-methylolacrylamide, acrylamide, methacrylamide, grycydylamide and the like can be cited.

The reasons why the materials mentioned above are preferred are because they have excellent adhesive strength and cohesive strength. Further, these materials are very stable in respect of light and oxygen since there are no unsaturated bonding in the polymer. Furthermore, it is possible to obtain any qualities and properties which are suitable for a particular application by selecting the types of monomer and their molecular weights appropriately.

As for examples of the rubber-based pressure-sensitive adhesives, natural rubber-based, isoprene rubber-based, styrene-butadiene-based, regenerated rubber-based and polyisobutylene-based materials can be cited. Further, block copolymers which contain rubber such as styrene-isoprene-styrene and styrene-butadiene-styrene systems can also be cited.

As for examples of the silicone-based pressure-sensitive adhesives, dimethylsiloxane and diphenylsiloxane-based materials can be cited.

The pressure-sensitive adhesives such as those described above can be used in the form of crosslinking type. In this case, various crosslinking agents such as epoxy-based compounds, isocyanate-based compounds, metal chelate compounds, metal alkoxides, metal salts, amine compounds, hydrazine compounds and aldehyde-based compounds and the like are used for crosslinking. Further, the method involving irradiation with radioactive beams can also be used. These methods can be selected appropriately in accordance with the type of functional groups for example.

As for the pressure-sensitive adhesive that constitutes the pressure-sensitive adhesive layer 3, one with a high molecular weight (degree of polymerization) is used in order to maintain firm bonding between the pressure-sensitive adhesive layer 3 and base material layer 2. Specifically, the weight-average molecular weight Mw of the principal polymer of the pressure-sensitive adhesive is preferably about 600,000 to 2,000,000, and more preferably about 800,000 to 1,800,000. If this Mw value is less that 600,000, the durability and bonding of the pressure-sensitive adhesive layer 3 with respect the base material layer 2 decreases when a large amount of plasticizer, as described below, is added. On the other hand, when Mw value exceeds 2,000,000, especially when little plasticizer is added, the elastic mudulus of the pressure-sensitive adhesive layer 3 increases while the flexibility thereof decreases, and thereby it becomes unable to sufficiently absorb and relax the contraction stress of the base material layer 2. As a result, it is difficult to obtain white marking and color unevenness prevention effects.

Moreover, the pressure-sensitive adhesives of this type are preferably those which have a property that transmits light (and especially those which are substantially transparent or semi-transparent).

Plasticizers are added to the pressure-sensitive adhesives as described above. In this case, since the pressure-sensitive adhesive 3 has appropriate elasticity and flexibility and therefore it can absorb and relax the contraction stress of the base material layer 2 as described above, it becomes possible to prevent the white marking or color unevenness from occurring.

As for examples of such plasticizers, esters such as phthalic acid esters, trimellitic acid esters, pyromellitic acid esters, adipic acid esters, sebacic acid esters, phosphate esters and glycol esters and the like, process oil, liquid polyethers, liquid polyterpenes and other liquid resins can be cited. In this case, just one of these, or a mixture of two or more types, can be selectively used.

As for the plasticizers, it is preferred that they have good compatibility or mutual solubility with the pressure-sensitive adhesive and have properties that can transmit light (especially those which are substantially transparent or semi-transparent).

The amount of plasticizer to be added is determined according to conditions such as the type of adhesive, its composition and its molecular weight. Normally, with respect to 100 parts by weight of adhesive (adhesive constituent), it is preferably 0.1 to 60 parts by weight, more preferably 1.0 to 50 parts by weight, and even more preferably 2.0 to 40 parts by weight. If too little plasticizer is added, the elastic modulus of the pressure-sensitive adhesive layer 3 increases while its flexibility decreases when, for example, the molecular weight of the adhesive is comparatively large. As a result, it becomes unable to sufficiently absorb and relax the contraction stress of the base material layer 2, thus making it difficult to obtain white marking and discoloration prevention effects. On the other hand, if too much plasticizer is added, this can give rise to degradation of properties such as cohesion breakdown of the pressure-sensitive adhesive layer 3 when, for example, the molecular weight of the adhesive is comparatively small. As a result, the bonding of the pressure-sensitive adhesive layer 3 with respect to the base material layer 2 also decreases.

Further, in addition to the plasticizers, various additives such as ultraviolet absorbers and anti-ageing agents, for example, can be added, as required, to the pressure-sensitive adhesive.

As for the pressure-sensitive adhesive layer 3, it is preferred that the layer has the following physical property.

The shear elastic modulus of the pressure-sensitive adhesive layer 3 is preferably of an extent such that neither cohesive failure nor boundary surface failure occur as a result of the shear stress which is produced by the contraction, for example, of the base material layer 2. In this embodiment, the shear elastic modulus is preferably set in the order of from $4.0 \times 10^5$ to $2.0 \times 10^5$ [dyn/cm$^2$], and more desirably set in the order of from $5.0 \times 10^5$ to $1.0 \times 10^6$ [dyn/cm$^2$].

If the ratio of the shear elastic modulus is too high, there is a decrease in the effect that relieves (absorbs or disperses) the stress which has been produced by the contraction or expansion (hereinafter, "contraction" means "contraction or expansion") of the base material layer 2 to prevent local concentration of the residual stress from being caused. On the other hand, if the shear elastic modulus is too low, cohesive failure or boundary surface failure are liable to occur.

Further, the relaxation elastic modulus of the pressure-sensitive adhesive layer 3 is preferably determined as follows. Here, the relaxation elastic modulus is represented with the value G(t) in the formula of $\sigma(t)=G(t)$ γo. Here, "t" represents a time elapsed from the application of a fixed strain γo, and "σ(t)" represents the stress at that time. Further, "σ(t)" is considered to be proportional to "γo". In the invention, "t" is taken to be 100 seconds.

Namely, the relaxation elastic modulus G(100) after 100 seconds of the pressure-sensitive adhesive layer 3 is preferably from $1.0 \times 10^5$ to $6.0 \times 10^5$ [dyn/cm$^2$], and most desirably from $2.0 \times 10^5$ to $5.0 \times 10^5$ [dyn/cm$^2$]. If the relaxation elastic modulus is too high, there is a decrease in the effect that relieves (absorbs or disperses) the stress which has been produced by the contraction or expansion (hereinafter, "contraction" means "contraction or expansion") of the base material layer 2 to prevent local concentration of the residual stress from being caused. On the other hand, if the relaxation elastic modulus is too low, cohesive failure or boundary surface failure are liable to occur.

In the present embodiment, the ratio of the contraction caused by the stress relaxation is preferably less than 5.0%, and more preferably from 0.1% to 4.5%.

As for the method for forming the pressure-sensitive adhesive layer 3, general coating methods, and especially the lamination method with transfer, can be cited.

The coating liquids used in the coating methods as typified by the lamination method with transfer may be organic solvent-based or emulsion-based, and they may also be aqueous solution type pressure-sensitive adhesives.

Further, as for other method of forming the pressure-sensitive adhesive layer 3, the extrusion method using a die or the like can be cited.

No particular limitation is imposed upon the total thickness of the pressure-sensitive adhesive layer 3 (the thickness of the pressure-sensitive adhesive layer after being dried). However, in a case where the pressure-sensitive adhesive layer according to the present invention is used in an application such as this embodiment, the thickness of the pressure-sensitive adhesive layer after being dried is preferably set to 3 to 400 μm, more preferably set to 5 to 150 μm and most preferably set to 10 to 90 μm.

Any types of release sheets can be used for the release sheet 4 which is stuck onto such a pressure-sensitive adhesive layer 3 as described above. For example, it is possible to use release sheets which have a base material formed from a film which is formed of various resins such as polyethylene terephthalate, polybutylene terephthalate, polycarbonate or polyarylate or the like. In such a base material, a release type coated layer (a silicone layer) (not shown in the drawings) is formed onto the contact surface thereof which is to be attached to the pressure-sensitive adhesive layer 3.

Furthermore, although not shown in the drawings, a protective sheet (protective film) may be stuck onto the surface (the surface on the opposite side to the pressure-sensitive adhesive layer 3) of the base material layer 2.

Figure 2:
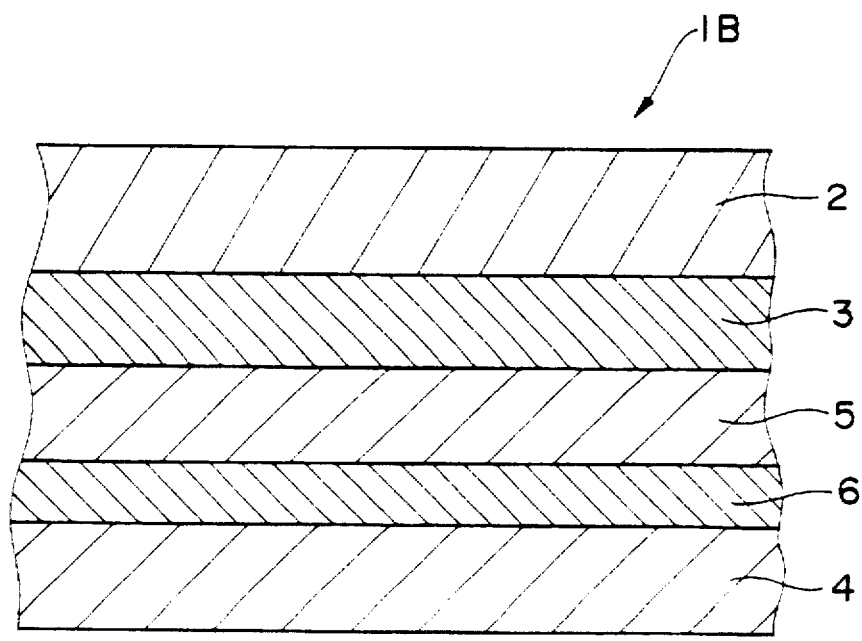
FIG. 2 is a cross-sectional view which shows a second embodiment of a pressure-sensitive adhesive sheet according to the present invention.

FIG. 2 is a cross-sectional view which shows a second embodiment of the present invention, in which a pressure-sensitive adhesive sheet of this invention is used as a light-polarizing sheet which is to be stuck onto a liquid crystal cell. The pressure-sensitive adhesive sheet 1B shown in the drawing is one which is mainly used for sticking onto STN liquid crystal cells. The pressure-sensitive adhesive sheet 1B has the same construction as that of the pressure-sensitive adhesive sheet 1A described above, excepting that a phase difference sheet 5 and a pressure-sensitive adhesive layer 6 (second pressure-sensitive adhesive layer) are provided between the pressure-sensitive adhesive layer 3 and the release sheet 4.

The pressure-sensitive adhesive sheet 1B forms a light-polarizing sheet with which elliptically polarized light is obtained as a whole due to the provision of the phase difference sheet 5. The phase difference sheet 5 is joined to the side opposite to the base material layer 2 of the pressure-sensitive adhesive layer 3. The phase difference sheet 5 is an optical compensation sheet for improving the viewing angle characteristics of the display color and the display contrast of the liquid crystal cell, and it may be, for example, a ¼ wavelength sheet or a ½ wavelength sheet. A single layer product, or a laminate product, of uniaxially oriented polymer film, or films, such as polycarbonate, polyarylate, polystyrene or polysulfone, for example, can be used for such a phase difference sheet 5.

The pressure-sensitive adhesive layer 6 is joined on the surface which is positioned on the opposite side to the pressure-sensitive adhesive layer 3 of the phase difference sheet 5. This pressure-sensitive adhesive layer 6 is formed from a single layer, and the material from which it is constructed may be the same as that cited for the pressure-sensitive adhesive layer 3 described earlier. Further, the pressure-sensitive adhesive layer 6 may be constructed with a laminate body of a plurality of layers, and in particular it may have a similar construction to the pressure-sensitive layer 3 described earlier.

A release sheet 4 as described earlier is stuck onto the surface which is positioned on the opposite side to the phase difference sheet 5 of the pressure-sensitive adhesive layer 6.

With the pressure-sensitive adhesive sheet 1B having the above-described construction, the pressure-sensitive adhesive layer 3 maintains its bonding strength with the base material layer 2 even if any contraction of the base material layer 2 occurs, thereby lifting and peeling are effectively prevented. Further, at the same time, the pressure-sensitive adhesive layer 3 relieves (absorbs or disperses) the stress which is produced as the base material layer 2 contracts, so that local concentration of the residual stress can be prevented. Hence, in a case where the pressure-sensitive adhesive sheet 1B is used by being stuck onto an STN liquid crystal cell, the occurrence of the color unevenness is prevented or suppressed.

In each of the embodiments described above, a light-polarizing sheet has been used for the base material 2, but the invention is not limited thereto and it may be some other sheet-like optical parts, such as an analyzer, a phase difference element (¼ wavelength sheet, ½ wavelength sheet for example), a light-rotating element (a Faraday element or a spontaneous light-rotating element) or any of a variety of optical filters.

Furthermore, the pressure-sensitive adhesive sheets of this invention are not limited to those which are used by being stuck onto liquid crystal cells and those which are used in optical parts which are used in other applications. Namely, this invention can be preferably applied to pressure-sensitive adhesive sheets in which deformations such as expansion, contraction and warping and the like are liable to arise in a base material layer thereof in response to changes in the environmental conditions, such as temperature and humidity.

[EXAMPLES]

The present invention is described in more detail below by means of practical examples.

(Example 1)

A pressure-sensitive adhesive layer was formed on one side of a light-polarizing sheet base material which forms a base material layer using a lamination method with coating and transfer, and then a release sheet was stuck onto the pressure-sensitive adhesive layer, to provide a pressure-sensitive adhesive sheet (dimensions: length 80 mm×width 150 mm) of this invention which has a construction as shown in FIG. 1. The structure of each layer in this case was as indicated below.

(1) Base Material of the Light-Polarizing Sheet
  Composition Material:
    Triple layer laminate comprising
      triacetylcellulose film;
      polyvinyl alcohol film; and
      triacetylcellulose film
  Thickness:
    180 μm (2) Pressure-Sensitive Adhesive Layer
  1. Compositions
    |Main polymer of the pressure-sensitive adhesive|
      An acrylic acid ester-based polymer of butyl acrylate of 95 parts by weight and acrylic acid of 5 parts by weight
    Weight-average molecular weight Mw:
      about 1,500,000
    |Plasticizer|
      Trioctyl trimellitate of 7 parts by weight with respect to 100 parts by weight of the main polymer
    |Cross-linking agent|
      Trimethylol propane tolylene diisocyanate of 0.1 parts by weight with respect to 100 parts by weight of the main polymer
  2. Production Method
    An adhesive solution containing the above compositions was prepared. This solution was applied to the same film as the release sheet described below, and then it was dried such that the thickness of the pressure-sensitive adhesive layer after being dried becomes 30 μm. Thereafter, thus obtained film was transferred to one surface of the polarizing panel base material by means of a transfer method. It was then aged at normal temperature for one week.
  3. Conditions and characteristics of the pressure-sensitive adhesive layer (shown in the attached Table 1)

(3) Release Sheet
  Constituent materials:
    Polyester film, silicone treated on one side (SP PET38, manufactured by Lintec Corporation)
  Thickness:
    38 μm (Example 2)

An pressure-sensitive adhesive sheet was produced in the same way as in Example 1, except that the composition of the pressure-sensitive adhesive layer was as follows.

|Main polymer of the pressure-sensitive adhesive|
  An acrylic acid ester-based polymer of butyl acrylate of 95 parts by weight and acrylic acid of 5 parts by weight
Weight-average molecular weight Mw:
  about 1,200,000
[Plasticizer]
  Di-2-ethylhexyl adipate of 5 parts by weight with respect to 100 parts by weight of the main polymer
[Cross-linking agent]
  Trimethylol propane tolylene diisocyanate of 0.15 parts by weight with respect to 100 parts by weight of the main polymer (Example 3)

An pressure-sensitive adhesive sheet was produced in the same way as in Example 1, except that the composition of the pressure-sensitive adhesive layer was as follows.

|Main polymer of the pressure-sensitive adhesive|
  An acrylic acid ester-based polymer of butyl acrylate of 95 parts by weight and acrylic acid of 5 parts by weight
Weight-average molecular weight Mw:
  about 1,800,000
[Plasticizer]
  Liquid polyether of 10 parts by weight with respect to 100 parts by weight of the main polymer

[Cross-linking agent]
Trimethylol propane tolylene diisocyanate of 0.08 parts by weight with respect to 100 parts by weight of the main polymer (Comparative Example 1)

An pressure-sensitive adhesive sheet was produced in the same way as in Example 1, except that the composition of the pressure-sensitive adhesive layer was as follows.

[Main polymer of the pressure-sensitive adhesive]
An acrylic acid ester-based polymer of butyl acrylate of 95 parts by weight and acrylic acid of 5 parts by weight
Weight-average molecular weight Mw: about 2,100,000

[Plasticizer]
Not added.

[Cross-linking agent]
Trimethylol propane tolylene diisocyanate of 0.1 parts by weight with respect to 100 parts by weight of the main polymer (Comparative Example 2)

An pressure-sensitive adhesive sheet was produced in the same way as in Example 1, except that the composition of the pressure-sensitive adhesive layer was as follows.

[Main polymer of the pressure-sensitive adhesive]
An acrylic acid ester-based polymer of butyl acrylate of 95 parts by weight and acrylic acid of 5 parts by weight
Weight-average molecular weight Mw: about 300,000

[Plasticizer]
Di-2-ethylhexyl adipate of 30 parts by weight with respect to 100 parts by weight of the main polymer

[Cross-linking agent]
Trimethylol propane tolylene diisocyanate of 1.0 parts by weight with respect to 100 parts by weight of the main polymer The conditions and characteristics of the pressure-sensitive adhesive layer of the respective examples are shown in the attached Table 1.

<Test 1>

The release sheets were removed from the above-mentioned pressure-sensitive adhesive sheets of Examples 1 to 3 and Comparative Examples 1 and 2, which were respectively fixed by their exposed surfaces to both sides of the glass plates for a liquid crystal cell in such a was as to form crossed Nicols. These samples were subjected to environmental conditions of 80° C., Dry, 1000 hours (first conditions) and to environmental conditions of 60° C.×90%RH, 1000 hours (second conditions), and the durability of the pressure-sensitive adhesive sheet and the occurrence of white marking phenomena (changes in transmissivity) were examined.

The results are shown in the attached Table 2.

In this regard, it should be noted that the assessment standards for the durability in Table 2 are as follows.

◎: No appearance change such as lifting, peeling or bubble formation occurs.

○: Any appearance change such as lifting, peeling or bubble formation is barely observed.

Δ: Appearance change such as lifting, peeling or bubble formation is fairly observed.

X: Pronounced appearance change such as lifting, peeling or bubble formation is generated.

Also, the assessment standards for white marking in Table 2 are as follows.

◎: No white marking is observed at all.

○: Any white marking is barely observed.

Δ: Some white marking is observed.

X: Pronounced white marking is generated.

As the results in Table 2 clearly show, with the pressure-sensitive adhesive sheets (adhesive polarizing plates) of Examples 1 to 3 of the present invention, it was confirmed that they had superior durability and could suppress the occurrence of white marking phenomena when they were used by being fixed to liquid crystal cells.

Conversely, the pressure-sensitive adhesive sheet of Comparative Example 1 had superior durability but there was marked white marking. Further, with the pressure-sensitive adhesive sheet of Comparative Example 2, the adhesive layer peeled away from the polarizing base material, and it could not withstand practical use.

(Examples 1' to 3', Comparative Example 1')

A phase difference sheet (quarter wavelength sheet) having one surface on which a second pressure-sensitive adhesive layer and a release sheet attached onto the adhesive layer are provided was first prepared. The other surface of the phase difference sheet is stuck onto the pressure-sensitive adhesive layer of the respective pressure-sensitive adhesive sheets obtained in the above-mentioned Examples 1 to 3 and Comparative Example 1, to produce, as entire assemblies, pressure-sensitive adhesive sheets configuring elliptical polarizers. Here, Examples 1' to 3' and Comparative Example 1' respectively correspond to Examples 1 to 3 and Comparative Example 1, respectively.

In these cases, the phase difference plate and the second pressure-sensitive adhesive layer were configured as follows.

(4) Phase difference sheet Constituent material: Polycarbonate film (single layer) Thickness: 60 μm (5) Second pressure-sensitive adhesive layer
Layer configuration: Single layer construction
Production method: A pressure-sensitive adhesive solution was prepared with the same composition as the pressure-sensitive adhesive layer in Example 1. This solution was applied onto one surface of the phase difference sheet, and it was then dried to form the second pressure-sensitive adhesive layer (having a dry film thickness of 30 μm).

<Test 2>

The release sheets were removed from the pressure-sensitive adhesive sheets of the above-mentioned Examples 1' to 3' and Comparative Examples 1' and stuck with the exposed second pressure-sensitive adhesive layers onto both sides of a glass plate for a liquid crystal cell in such a way as to form crossed Nicols. Thus obtained samples were left to stand under the aforementioned first conditions and second conditions and the occurrence of color unevenness was assessed visually.

The results are shown in Table 3 attached to the specification.

Moreover, the assessment standards used in Table 3 were as follows:

◎: No color unevenness is seen at all.

○: Any color unevenness is barely seen.

Δ: Some color unevenness is observed.

X: Quite a lot of color unevenness is observed.

As is clear from the results shown in Table 3, it is confirmed that when the pressure-sensitive adhesive sheets (pressure-sensitive adhesive light-polarizing sheets) of this invention from Examples 1' to 3' are used by being stuck onto a liquid crystal cell the occurrence of color unevenness can be suppressed.

On the other hand, there was pronounced color unevenness with the pressure-sensitive adhesive sheet of Comparative Example 1'.

|Effect of the Invention|

As has been described above, with the pressure-sensitive adhesive sheets of this invention there is no lifting or peeling of the pressure-sensitive adhesive layer with respect to the base material layer. Further, since the stress which is produce by contraction of the base material layer is relieved by the pressure-sensitive adhesive layer, the local stress concentration at the edges of the sheet can be reduced.

Consequently, this has the effect of suppressing the phenomena which are produced by the uneven stress distribution in the base material layer, such as the white marking with TN (TFT) liquid crystal cells and the color unevenness with STN liquid crystal cells for example.

Furthermore, in the pressure-sensitive adhesive sheets of this invention, it is possible to obtain the aforementioned results with a relative simple layered structure, and therefore its production is easy.

Finally, it should be noted that the present invention is no way limited to the embodiments described above. The scope of the present invention is determined only by the following claims.

TABLE 3

| Environmental Conditions Items to be examined | 80° C., Dry for 1000 hours | | 60° C. × 90% RH for 1000 hours | |
|---|---|---|---|---|
| | Durability | Presence of color unevenness | Durability | Presence of color unevenness |
| Example 1' | ⊚ | ○ | ⊚ | ○ |
| Example 2' | ⊚ | ⊚ | ⊚ | ⊚ |
| Example 3' | ○ | ○ | ○ | ○ |
| Comparative Example 1' | ⊚ | X | ⊚ | X |

What is claimed is:

1. A pressure-sensitive adhesive sheet to be used for a liquid crystal cell of a liquid crystal display, comprising:

a base material layer formed into a light polarizing sheet or a phase difference sheet used in the liquid crystal display; and a pressure-sensitive adhesive layer including an acrylic-based pressure-sensitive adhesive composition and a plasticizer, wherein the weight-average molecular weight of the main polymer of the pressure-sensitive adhesive composition of said pressure-sensitive adhesive layer is 600,000 to 2,000,000 whereby stress which would be produced by contraction of said base material layer is relieved by the pressure-sensitive adhesive layer to prevent color unevenness or white marking from appearing on the liquid crystal display.

2. The pressure-sensitive adhesive sheet as claimed in claim 1, wherein the shear modulus of said pressure-sensitive adhesive layer is $4.0 \times 10^5$ to $2.0 \times 10^5$ [dyn/cm$^2$].

3. The pressure-sensitive adhesive sheet as claimed in claim 1, wherein the relaxation modulus after 100 seconds

TABLE 1

| | | | | Thickness of Pressure-sensitive Adhesive Layer [μm] | ( Conditions and Properties of Pressure-sensitive Adhesive Layer ) | |
|---|---|---|---|---|---|---|
| | Plasticizer [parts by weight] | Crosslinking Agent [parts by weight] | Weight-average Molecular Weight | | Shear Elastic Modulus [×10$^6$ dyn/cm$^2$] | Relaxation Elastic Modulus [×10$^5$ dyn/cm$^2$] |
| Example 1 | 7 | 0.1 | about 1,500,000 | 30 | 0.93 | 3.13 |
| Example 2 | 5 | 0.15 | about 1,200,000 | 30 | 1.20 | 3.50 |
| Example 3 | 10 | 0.08 | about 1,800,000 | 30 | 0.56 | 2.20 |
| Comparative Example 1 | 0 | 0.1 | about 2,100,000 | 30 | 3.10 | 9.70 |
| Comparative Example 2 | 30 | 1.0 | about 300,000 | 30 | 0.38 | 0.92 |

Elastic Modulus Measurement Device: Rheometrics RDS-II

TABLE 2

| Environmental Conditions Items to be examined | 80° C., Dry for 1000 hours | | 60° C. × 90% RH for 1000 hours | |
|---|---|---|---|---|
| | Durability | Presence of White Marking | Durability | Presence of White Masking |
| Example 1 | ⊚ | ⊚ | ⊚ | ⊚ |
| Example 2 | ⊚ | ○ | ⊚ | ○ |
| Example 3 | ○ | ⊚ | ○ | ⊚ |
| Comparative Example 1 | ⊚ | X | ⊚ | X |
| Comparative Example 2 | X | Determination could not be made due to peeling off of the pressure-sensitive adhesive layer | X | Determination could not be made due to peeling off of the pressure-sensitive adhesive layer |

G(100) of said pressure-sensitive adhesive layer is $1.0 \times 10^5$ to $6.0 \times 10^5$ [dyn/cm$^2$].

4. The pressure-sensitive adhesive sheet as claimed in any of claim 1, wherein the amount of the said plasticizer added is 0.1 to 60 parts by weight with respect to 100 parts by weight of the pressure-sensitive adhesive composition.

5. A pressure-sensitive adhesive sheet to be used for a liquid crystal cell of a liquid crystal display, comprising:

a. a base material layer formed into a light polarizing sheet or a phase difference sheet used in the liquid crystal display;

b. a pressure-sensitive adhesive layer including an acrylic-based pressure-sensitive adhesive composition and a plasticizer for lowering the shear elastic modulus of the pressure sensitive adhesive layer, wherein the weight-average molecular weight of the main polymer of the pressure-sensitive adhesive composition of said pressure-sensitive adhesive layer is 600,000 to 2,000,000 whereby stress which would be produced by contraction of said base material layer is relieved by the pressure-sensitive adhesive layer to prevent color unevenness or white marking from appearing on the liquid crystal display.

* * * * *

UNITED STATES PATENT AND TRADEMARK OFFICE
CERTIFICATE OF CORRECTION

PATENT NO. : 5,795,650
DATED : August 18, 1998
INVENTOR(S) : Shunpei Watanabe et al It is certified that error appears in the above-identified patent and that said Letters Patent is hereby corrected as shown below:

<u>On the Title Page</u>: Item [56]

In column 1, line 1, under "U.S. PATENT DOCUMENTS", please change "4/1891" to --4/1987--.

In column 5, line 35, please change "$2.0 \times 10^5$" to --$2.0 \times 10^6$--.

<u>In the Claims</u>
Column 12,
In claim 2, line 31, please change "$2.0 \times 10^5$" to --$2.0 \times 10^6$--.

Signed and Sealed this

Twenty-eighth Day of November, 2000

Attest:

Q. TODD DICKINSON

Attesting Officer   Director of Patents and Trademarks